United States Patent [19]
Cotter

[11] Patent Number: 5,951,064
[45] Date of Patent: Sep. 14, 1999

[54] MODULAR FLUID CONTROL PANEL AND CONNECTOR FITTINGS

[75] Inventor: Jonathan P. Cotter, Dearborn, Mich.

[73] Assignee: Diebolt International, Inc., Plymouth, Mich.

[21] Appl. No.: 08/923,747

[22] Filed: Sep. 2, 1997

[51] Int. Cl.[6] ............................. F16L 37/00; F16L 39/00; F16L 17/00
[52] U.S. Cl. ........................... 285/305; 285/321; 285/355
[58] Field of Search .................... 285/305, 321, 285/355, 370, 390, 39, 276

[56] References Cited

U.S. PATENT DOCUMENTS

| | | | |
|---|---|---|---|
| 1,899,343 | 2/1933 | Mackey et al. | 285/321 |
| 2,772,898 | 12/1956 | Seeler | 285/305 |
| 2,872,963 | 2/1959 | Boyer | 285/39 |
| 3,055,685 | 9/1962 | Ensinger | 285/370 |
| 3,074,748 | 1/1963 | Ulrich | 285/355 |
| 3,245,701 | 4/1966 | Leopold, Jr. et al. | 285/355 |
| 4,704,000 | 11/1987 | Torgardh | 285/305 |
| 4,838,527 | 6/1989 | Holley | 267/64.28 |
| 5,020,370 | 6/1991 | Cotter | 137/596 |
| 5,020,570 | 6/1991 | Cotter | 137/596 |
| 5,303,906 | 4/1994 | Cotter | 267/64.11 |
| 5,443,580 | 8/1995 | Cotter | 285/276 |
| 5,536,050 | 7/1996 | McDermott et al. | 285/370 |

FOREIGN PATENT DOCUMENTS

| | | | |
|---|---|---|---|
| 0860870 | 2/1961 | United Kingdom | 285/305 |
| 0966334 | 8/1964 | United Kingdom | 285/305 |
| 2195725 | 4/1988 | United Kingdom | 285/305 |

*Primary Examiner*—Brian K. Green
*Assistant Examiner*—Marcus Dolce

*Attorney, Agent, or Firm*—Barnes, Kisselle, Raisch, Choate, Whittemore & Hulbert, P.C.

[57] ABSTRACT

An array of a plurality of module blocks with a common through-passageway with a combined fluid coupling and mechanical connector fitting received in the passageway between each pair of adjacent blocks. The fitting has a swivel body rotatably retained by a flexible retaining wire on a main body with two static-type O-rings. The main body has external straight threads on one end and a hex head protrusion adjacent the other end. A fluid conducting through-passageway in the main body has an enlarged cylindrical counterbore open at the hex end and with a circular internal groove therein. A tangentially intersecting wire-insertion radial opening leads from an external surface of the hex head into this groove. The swivel body has external straight male threads at one end, a cylindrical shank at the other end and a fluid conducting through-passageway communicating at one end with the main body passageway and having a hex socket in the other passageway end. An external groove on the shank registers with the counterbore internal groove when the shank is slidably inserted therein. The flexible retainer wire is then inserted via the hex head insertion opening into the registered coupling grooves to thereby permanently connect the bodies in axially fixed relationship while permitting relative rotation therebetween. The main body is threaded into the exposed end opening of a common passageway in first module block. Then a male hex rod tool is inserted through the like-passageway of a second block to be adjoined to the first block, and into the hex socket of the swivel body of the fitting to thereby rotatably thread it into the second block and thereby draw the two adjacent module blocks securely into side face-to-side face relationship. The fitting then functions as both a fluid coupling communicating the associated common passageway of the coupled blocks as well as a mechanical tie connector and alignment pin between these coupled blocks.

16 Claims, 2 Drawing Sheets

MODULAR FLUID CONTROL PANEL AND CONNECTOR FITTINGS

FIELD OF THE INVENTION

This invention relates to the fluid conduit systems and connector fittings and more particularly to fluid connector fittings for modular panel arrays such as manifold, distribution and/or control blocks in systems utilizing high pressure fluid operated devices.

BACKGROUND OF THE INVENTION

Conventional modular control valve panels have a plurality of individual valve modules equipped with associated valves and fittings to deliver and/or exhaust high pressure air, gas or hydraulic fluid to fluid-operated devices, such as nitrogen gas springs often used in stamping operations to yieldably hold a clamping ring of a die assembly. Examples of such modular control panels, valves and fittings are disclosed in U.S. Pat. Nos. 4,838,527; 5,020,570 and 5,443, 580. Examples of gas springs served by such systems are disclosed in U.S. Pat. Nos. 5,303,906 and 4,838,527, all of the aforementioned patents being incorporated herein by reference.

The modules in these conventional control panels are typically constructed as individual solid rectangular blocks adapted for modular side-by-side mounting in a suitable system panel array. The individual module valve, valve controls and associated fluid inlet and outlet couplings for the remotely associated individual or grouped fluid-operated devices are typically provided in the front and rear faces of each block and sometimes on the top face as well. A fluid supply block and a fluid bleed block are also preferably provided at the opposed ends of the array of valve blocks to form an integrated system for the metered distribution, monitoring and exhausting of high pressure fluid, such as nitrogen gas. Each valve module is individually controlled, preferably by a single valve mechanism. The panel can be expanded or contracted to include any number of valve modules. However, the supply module supplies gas to all of the valve modules in the panel, and all of the valve modules are bled through the bleed module. A common supply passageway and a parallel common bleed passageway extend from side-to-side laterally through each valve module, and intermodule fluid coupling of these passageway segments is provided by tubular alignment pins each sealed by an O-ring at the lateral interfaces of the modules. Another pair of common parallel through-passageways are provided to extend laterally through a central plane of each module for receiving a suitable sized tie rod, or preferably an in-line series of modular nuts and tie rods for clamping the modules together in the panel array, the number of such modular tie rods and nuts being determined by the number of modules in the panel.

SUMMARY OF THE INVENTION

A combined fluid coupling and mechanical connector swivel fitting which interconnects a common passageway in adjacent modular blocks to thereby eliminate the need for tie rod passageways and associated tie rod fittings and hardware and provide a compact modular assembly. The fitting is a simple swivel nut type assembly of two tubular pieces.

One tubular piece of the fitting is a main body with external straight threads on one end and a hex head protrusion adjacent the other end. This body has a fluid conducting through-passageway with an enlarged cylindrical counterbore opening at the hex end and having a circular internal groove therein, and a tangentially intersecting wire-insertion radial opening leading from an exterior surface of the hex head into the groove.

The other tubular piece is the swivel part of the fitting and has a body with external straight male threads at one end, a cylindrical shank at the other end and a fluid conducting through-passageway having a hex socket in the threaded end of the body. An external groove on the shank registers with the counterbore internal groove when the shank is slidably inserted therein. A retainer wire is inserted into the insertion opening of the coupling groove and pushed into the groove until the leading end abuts the incoming run of the wire, and then the excess externally protruding wire is cut-off, thereby permanently interconnecting the two swivel parts in axially fixed relationship while permitting relative rotation therebetween. Two O-rings are both carried on the main body so as to straddle the hex head protrusion, and function merely as static seals since the main body remains stationary when the swivel body is rotated to interconnect adjacent blocks.

The main body of the assembled fitting is first threadably installed in one of the two mutually facing threaded end openings of a common passageway of two adjacent module blocks. A male hex tool is then inserted endwise through the open end of the passageway of the other block and then into the hex socket of the fitting to rotate the swivel body to thereby thread it into the passageway and draw the two adjacent module blocks securely into side face-to-side face relationship. The fitting then functions as both a fluid coupling communicating the associated passageway of the coupled blocks as well as a mechanical tie connector and alignment pin between these coupled blocks.

OBJECTS OF THE INVENTION

Objects of the present invention are to provide an improved modular block intercoupling system, a combined fluid coupling and mechanical interconnector fitting, eliminate the need for dual tie rod passageways in modular blocks as well as associated tie rod fittings and hardware, enable face-to-face contact mounting of adjacent module blocks to provide a more compact array, use one standard coupling/connector fitting regardless of the number of module blocks added to an array, eliminate the need for alignment dowel pins or tubular fluid coupling alignment pins to assure block-to-block registry of a multiplicity of through-passageway openings, provide a fitting that is easily installed with available tools, provide a leak-free high pressure seal, minimize the length of a multiple modular block array, is easily and economically manufactured and assembled, and requires minimal modification of existing designs of modular blocks.

BRIEF DESCRIPTION OF THE DRAWINGS

These as well as other objects, features and advantages of the invention will be apparent from the following detailed description of the preferred embodiment and best mode, appended claims, and accompanying drawings (which are to engineering scale unless otherwise indicated) in which:

DETAILED DESCRIPTION OF THE PREFERRED EMBODIMENTS

Figure 1:
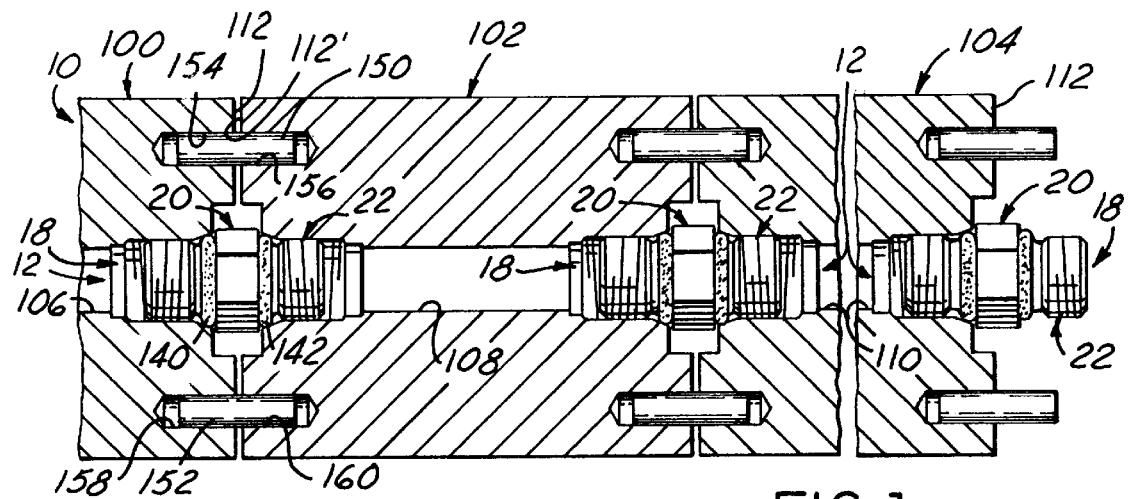
FIG. 1 is a fragmentary horizontal center sectional view through three module blocks taken along the axis of a common passageway with three of the improved fluid coupling/mechanical connector union swivel fittings of the invention installed therein in accordance with the modular system of the invention.

Referring more particularly to the drawings, FIG. 1 illustrates a modular control panel 10 embodying this invention with a plurality of modular blocks 100, 102, 104 with at least one common coaxial through-passageway 12 with a swivel fitting 18 both mechanically tying or attaching together adjacent blocks and interconnecting and sealing adjacent portions of the common passageway in which the fastener is received. If desired, a swivel fitting 18 may also be provided in the free end of an end block 104 of a module for connecting to another coupling such as a hose connector fitting. Each fastener 18 has a main body 20 and a swivel body 22 which is rotatably retained in the main body preferably by a wire permanent swivel retainer assembly of the type also shown, for example, in Mackey et al U.S. Pat. No. 1,899,343. To provide a fluid seal between adjacent passageway portions, a pair of O-ring seals are preferably carried by the main body.

Figure 2:
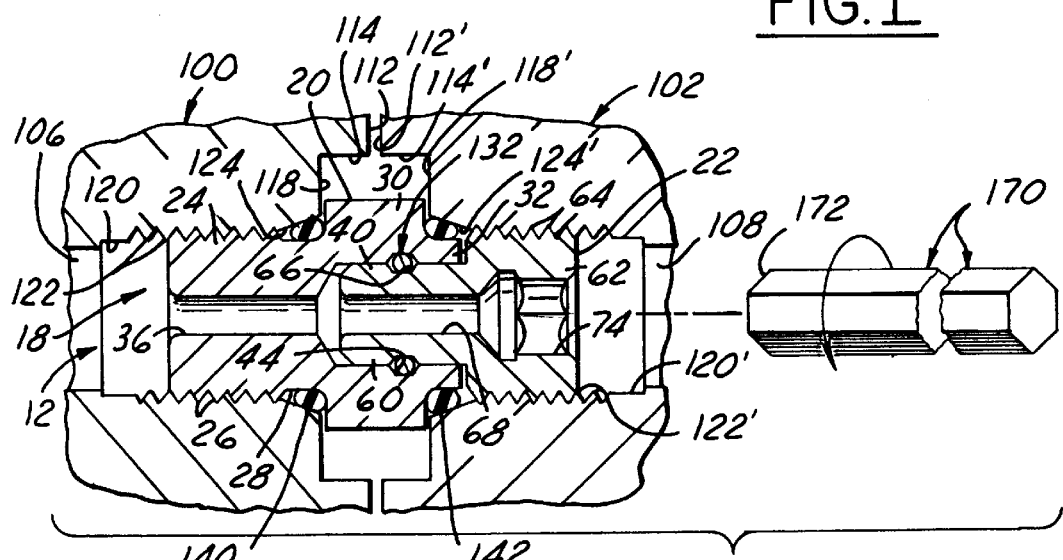
FIG. 2 is a fragmentary sectional view of one of the fittings as installed in FIG. 1 illustrated on an enlarged scale, and illustrating an associated male hex assembly tool for use in accordance with the system of the invention.
Figure 3:
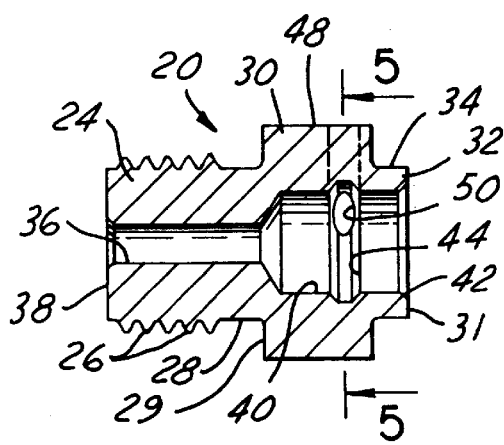
FIG. 3 is a full sectional view of the main body of the fitting taken on line 3—3 of FIG. 4.
Figure 4:
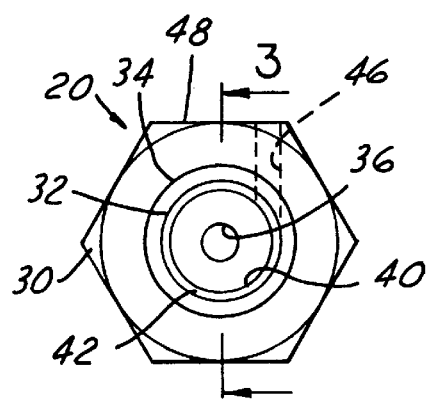
FIG. 4 is an end view of the fitting of FIG. 3.
Figure 5:
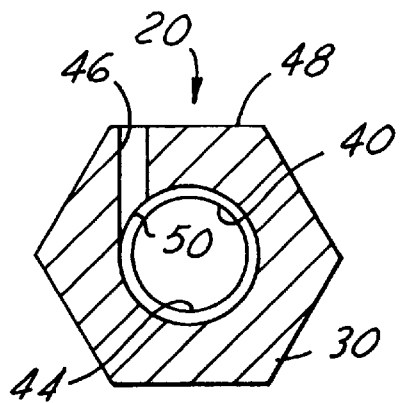
FIG. 5 is a cross-sectional view taken on line 5—5 of FIG. 3.

As shown in FIGS. 2 and 3, the main body 20 has a cylindrical shank portion 24 provided with external straight male threads 26 and a cylindrical O-ring seat portion 28, and an enlarged hexagonal nut portion 30 flanked at its opposite sides by seat 28 and a cylindrical extension portion 32 providing a second O-ring seat 34.

Interiorly, the main body 20 has a relatively small diameter, axially extending central fluid passageway 36 exteriorly opening at an end face 38 at the threaded end of the part, and opening at its interior end to an enlarged cylindrical coaxial counterbore 40 in turn opening exteriorly at a chamfer 42 in shoulder portion 32 at the hex end of the part. Counterbore 40 is provided with a 360° internal groove 44 registering axially with hex portion 30. A coupling wire insertion passage 46 extends perpendicularly from one face 48 of hex portion 30 into groove 44 at a tangential entry opening 50.

Figure 6:
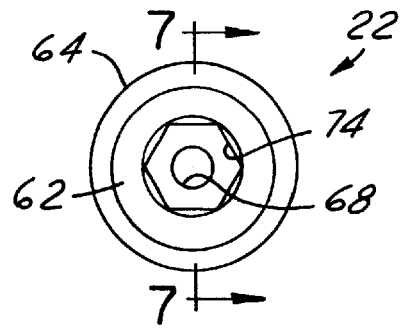
FIG. 6 is an end view of the hex socket swivel body of the fitting.
Figure 7:
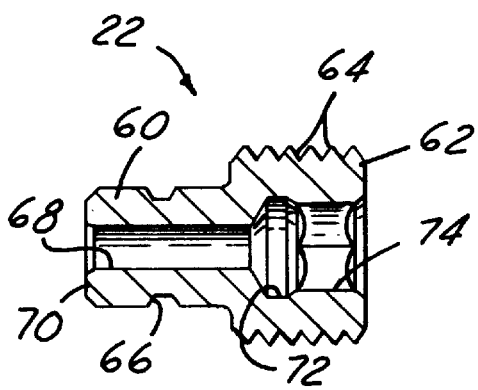
FIG. 7 is a full sectional view taken on the line 7—7 of FIG. 6.

Referring to FIGS. 6 and 7, hex socket swivel body 22 has a cylindrical smooth surface shank portion 60 and an enlarged cylindrical head portion 62 carrying external straight male threads 64. Shank 60 has an external, circumferentially continuous groove 66 formed approximately midway therealong oriented to register axially in assembly (as shown in FIG. 2) with groove 44 of the main body 20. Swivel body 22 has a relatively small diameter central passageway 68 opening exteriorly at one end to a shank end face 70 and opening interiorly at its other end into an enlarged diameter counterbore 72 having an internal hexagonal socket 74 formed therein and in turn opening exteriorly at the threaded end of the part.

Figure 8:
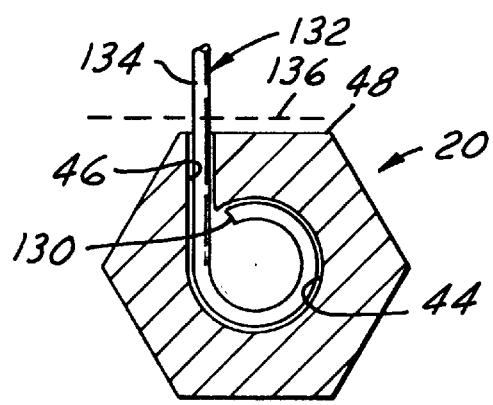
FIG. 8 is a cross-sectional view similar to FIG. 5 but illustrating the installation of the flexible connector wire in the fitting assembly when the two parts are positioned as shown in FIG. 2.

To assemble the components of the fitting 18, the shank 60 of the swivel body 22 is slidably telescoped into the counterbore 40 of the main body 20 until shank groove 66 is radially aligned to axially register with counterbore groove 44 and then a wire 132 is disposed therein as shown in FIG. 2 to retain them in assembled relationship. The leading end 130 (FIG. 8) of an initially straight length of flexible retainer wire 132 is inserted into the open end of passageway 46. Wire 132 is then pushed further into the passageway until the leading end engages the annular cavity formed by the mating grooves 44 and 66. The wire is then pushed further with sufficient force to move the leading end 130 around the circular path of the groove until it abuts the trailing run 134 of wire 132, as shown in FIG. 8. Then the exteriorly protruding portion of wire 132 is suitably severed at the cut line shown at 136 in FIG. 8, preferably flush with the adjacent end hex face 48. It will be seen that the swivel body 22 now can be rotated freely relative to the main body 20 but the two parts are permanently axially interconnected by retainer wire 132 as so installed in this subassembly. As will be well understood by those of ordinary skill in the art as, for example, from the aforementioned Mackey '343 patent (see page 3, column left, lines 20–26), the severed end of wire 132 is preferably welded or brazed in the outer open end part of passageway 46 to thereby sealably close the same.

Next, a pair of O-rings 140 and 142 (FIGS. 1 and 2) are respectively received preferably with a snug fit on the annular seating and sealing surfaces 28 and 34 of the main body 20 so as to flank against the adjacent radial sealing faces of hex portion 30. With the O-rings so installed, the coupling/connector fitting 18 is now completed as a standardized fitting and ready for use in the modular block coupling system of the invention.

Referring now to FIG. 1, an interconnected array of three identical module blocks 100, 102 and 104 of the invention are shown in a panel array, with the adjoining pairs of blocks both mechanically tied together and in common fluid intercommunication utilizing the coupling/connector fittings 18 in accordance with the coupling system of the invention. In this illustration the coaxially aligned pressurized gas supply common passageway 12 with passage segments 106, 108 and 110 through blocks 100, 102 and 104 respectively is utilized for installation of fittings 18. It is to be understood that these blocks may have one or more additional coaxial common passageways such as a gas bleed passageway not shown, but typically lateral spaced apart from and extending parallel to passageway 12 which are identically provided with further fittings 18 in the same manner.

As shown in FIGS. 1 and 2, to accommodate the coupling system of the invention the axially opposite end openings of the supply passageway segment in each block are threaded and preferably open into a counterbored recess. Referring first to block 100, its planar side face 112 is machined to form a large diameter cylindrical recess having a cylindrical face 114 and a flat radial bottom face 118. Cylindrical surface 114 is coaxial with passageway 106 and slightly larger in diameter than the maximum outside dimension of the hex portion 30 of the main body 20. The depth of the recess, i.e., axial distance from the bottom face 118 to the block end face 112, is made slightly less than half the axial dimension of the hex portion 30 of the main body 20. A coaxial counterbore 120 is machined into the associated end of passageway 106 and provided with internal straight threads 122 adapted to threadably mate with threads 26 of main body 20. The outer end of counterbore 120 is machined into a shallow angle chamfer 124 to provide a frusto-conical annular O-ring seating and sealing surface opening into recess bottom face 118.

Each end of each block through-passageway segment 106, 108 and 110 is identically so configured, and hence like reference numerals raised by a prime suffix designate the corresponding structure of the end of passageway 108 of block 102 registered with passageway 106 as shown in FIG. 2. Since this structure is identical for each end of each passageway of each block it will not be described for the remaining blocks.

In assembling the modular block array 100, 102 and 104, assuming it is to be built up successively from left to right as viewed in FIG. 1 and starting with block 100 in this sequence, first one of the fittings 18 is installed in the outlet end of supply passageway 106 of block 100 opening at its side face 112 in the manner illustrated by the fitting 18 shown as installed at the right hand open end face 112 of block 104 in FIG. 1. Thus, threaded shank 24 of the first fitting is inserted into the open end of passageway 106 until threads 25 engage passageway threads 122. This fitting 18 is then threadably rotated into the passageway until O-ring 140 engages seating surface 124 and the leading face 29 of hex portion 30 is disposed closely adjacent, or preferably seats on recess bottom face 118. This squeezes O-ring 140 with a predetermined compression force between surfaces 124, 28 and 29 into a static sealed condition for preventing escape of pressurized fluid from passageway 106 around the exterior of the main body 20 of this fitting.

Then another fitting 18 is installed in the same manner into the outlet end of the bleed passageway (not shown) extending parallel to passage 106 through block 100 at its outlet opening to block side face 112. With these two fittings 18 so installed on face 112 of block 100 it is ready to accept the next successive modular block 102 in the array.

If desired, as also shown optionally in FIG. 1, blocks 100, 102 also may be provided with suitable orienting dowel pins 150 and 152 inserted into associated blind bore alignment holes 154, 158 adapted for coaxial registry with blind bore alignment hole 156 and 160 in the facing side 112' of block 102. However preferably blocks 100 and 102 are intercoupled only by a spaced pair of fittings 18 preferably disposed in or close to a central plane of the block to optimize distribution of connecting stresses between the blocks. Fittings 18 then also serve as interblock alignment pins and thereby eliminate the need for additional alignment dowel pins 150 and 152.

To assemble adjoining block 102 to block 100, the left hand end of supply passageway 108 of block 102 (as viewed in FIG. 1) and likewise that of the bleed passage of block 102 (not shown), are coaxially aligned and registered with the threaded heads 62 of the two fittings 18 protruding from face 112 of block 100 for starting their fitting threads 64 into passageway threads 122'. A special assembly tool 170 (FIG. 2) is provided for this purpose and consists simply of a suitable length of hexagonal bar stock dimensioned for slip fit insertion of its left hand end (as viewed in FIG. 2) into fitting socket 74. Tool 170 is made longer than the lateral dimension of individual blocks 100–104 measured between their side faces so as to protrude at its right hand free end beyond the trailing side face of the block being mounted. This protruding free end of bar tool 170 may be chucked in a conventional manual or power hand held tool driver provided with a max torque adjustment clutch chuck if desired.

In use and with blocks 100 and 102 still spaced apart, tool 170 is inserted, with its leading end 172 first, axially through passageway 108 and engaged in fitting socket 74 while it is still spaced away from side face 112' of block 102. Another tool 172 may likewise be inserted through the bleed passageway of block 102 and inserted into the socket 74 of the companion fitting 18. This pair of tools may then be used as rough guides in bringing both fitting heads 62 into registry with the left hand entrance of both supply passageway 108 and the bleed passageway. Such thread starting registry is also assisted by the flared entryways provided by the shallow angle chamfer 124' in block 102. Then, once threads 64 of each fitting have been started in passageway threads 122', each tool 170 is driven in whichever direction of rotation causes threads 64 to draw block 102 toward block 100 until O-ring 142 is registered and compressed between second O-ring seat 34 and shallow angle chamfer 124', and against outer hex face 31. Preferably, the axial dimension of hex head portion 30 is predetermined relative to the depth of recess bottom faces 118 and 118' to come into abutment with them to set the fully installed closure of the two blocks together and to control the static precompression stresses on both O-rings 140 and 142.

It will be noted that the rotatable coupling of swivel body 22 to the preinstalled main body 20 of fitting 18 allows the main body 20 to remain stationary while the swivel body 22 is rotated to thread swivel head 62 into threads 122' of the left hand entrance of passageway 108. Since O-rings 140 and 142 are both mounted on the stationary main body 20, these O-rings need not operate as rotary seals and can be the less expensive static type used in an SAE-straight static fitting and without the need for a back up washer for the O-rings.

It is also to be understood that when two laterally spaced fittings 18 are provided as connectors between each adjacent set of blocks such as to intercouple both a gas supply passageway and a gas bleed passageway block-to-block as described previously, preferably the two driver tools 170 are employed concurrently so that initial interblock passageway alignment, fitting interblock registry and coupling threading into block 102 proceeds for both couplings concurrently to provide even take-up and prevent skewing of the blocks during such assembly.

To intercouple the next successive block 104 to block 102 as shown in FIG. 1 the foregoing procedure of first installing a pair of fittings 18 in block 102 is repeated relative to the right hand entrance of supply passageway 108 and of the parallel bleed passageway in block 102, followed by coupling attachment of this pair of fitting 18 to the left hand end of passage 110 of block 104 and of the bleed passageway (not shown). The foregoing fitting mounting and interblock assembly steps is again repeated for as many blocks as are to be stacked up in the modular block array.

If the modular array is to include end blocks such as a supply module at one end of the array and a bleed module at the other end of the array, as shown in the aforementioned '570 patent, then, after assembly of these end blocks in the array of blocks, the exit ends of the supply and bleed passageways at the exposed end faces of these end blocks are each closed by a suitable sealing plug threaded into the threads 26 provided at these passageway ends. It is also to be understood that fitting threads 26 and 64 both may be right hand threads for right hand threaded passageway ends, or may be oppositely threaded for oppositely threaded passageway ends, as desired, since swivel body 22 can be rotated in either direction of rotation during assembly operations while the main body 20 remains stationary.

By way of example and not by way of limitation, in one working embodiment of the invention constructed pursuant to the foregoing disclosure, the following parameters were observed:

Size of hex portion 30—9/16"
O.D. of threads 26 and 64—7/16"
Specification of threads 26, 122, 64', 122'—7/16"—20
Specification of O-rings 140, 142—0.07" DIA
Taper angle of sealing surfaces 124, 124'—12°
Entrance diameter of surfaces 124, 124'—0.487"
Diameter of sealing surfaces 28 and 34—0.365"
Material of fitting bodies 20 and 22—Low Carbon Steel
Diameter of wire 132—19 ga. (0.042")
Material of wire 132—Galvanized (Paper-Clip Temper)
Diameter of wire feed hole 146—0.062"
Radial depth of grooves 66 and 44 0.020"
Working nitrogen gas pressure range through interconnected passageways 106, 108 and 110—3000 psi
Clearance between block faces 112 and 112' when fully assembled as in FIG. 1—-0.0±0.012"

From the foregoing description and drawings, it will now be apparent to one skilled in the art that the invention as so disclosed in the foregoing exemplary but preferred embodiment amply fulfills the aforestated objects and provides many advantages over the prior art. A fitting 18 of the invention is easily installed with available inexpensive manual or powered hand tools, provides a leak-free high pressure seal and adds minimal additional tolerances to the module block assembly. Any application that has two axially aligned, mutually facing ports in planar face opening orientation may be assembled with one or more fittings 18, provided there is through-hole access on one side of the joint. The design of fitting 18 is such that it can be easily scaled to fit various port sizes. Since the two static O-rings 140, 142 are both positioned on the stationary main body 20 as an SAE-straight fitting would normally require, they need only serve as static and not dynamic seals when the assembly is drawn tight. All of the fitting components are designed for ease of manufacture on high volume mass production equipment, with the additional benefit of requiring no special machining or forming on the module blocks to be adjoined other than the straight-forward preparation of the axially opposite ends of the through-passageways as described previously in conjunction with FIG. 2.

A major cost saving is obtained by the elimination of the dual tie rod connector passageways in the module blocks and the associated tie rod hardware of the prior art as described previously. Since no relative rotation is required between the module blocks during their assembly into array interconnection, the components, controls and hoses required for each individual manifold block can be preassembled to the same prior to assembly of the module blocks into the array. The system of the invention enables the adjacent module blocks of the array to be mechanically tied together and the common fluid passageways intercoupled with substantially zero clearance between blocks of the array. Hence the coupling system of the invention does not increase the overall assembled length of the array.

The simple subassembly procedure required to complete the two part coupling fitting 18 and the simple assembly procedure required to couple adjoining blocks in the modular panel array using tool 170, require no special skills, thereby further contributing to manufacturing and assembly economy and reliability. The coupling system and components of the invention can readily accommodate whatever number of modules may be desired to provide a modular array using coupling components that are rugged, durable, reliable and of simplified design and economical to manufacture and assemble.

It is also to be understood that if desired, fitting 18 may be used solely as a modular mechanical tie rod connector between adjacent module blocks of a modular array. For such alternate use, fitting 18 may be simplified and rendered less expensive by elimination of O-rings 140 and 142 and fluid passages 36 and 68. Additional cost savings can thus accrue due to such part standardization and resultant inventory reduction, and because such single-purpose tie connectors readily can be further machined into the dual purpose fittings 18 and equipped with O-rings 140, 142.

It is also to be understood that for certain applications other retainer assemblies 14 for axially mechanically coupling the main and swivel bodies 20 and 22 against relative axial motion therebetween may be substituted for coupling wire retainer 132. For example, grooves 44 and 66 may be reconfigured for acceptance of a conventional C-type spring snap ring which is yieldably and resiliently compressed to fit within bore 40. In its free state such a snap ring may be loosely carried in groove 66 of swivel body 22 as a preassembly for insertion into main body 20, thereby then compressing the snap ring until it registers with the external groove in body 20 and then snaps out to be axially captured by both grooves. Use of such a snap ring retainer thus eliminates the need for wire insertion hole 46 and its assembly and cut-off procedures.

I claim:

1. A connector swivel fitting for use in coupling adjacent module blocks of a modular block fluid control valve panel array in side-by-side abutted relation, said fitting comprising a generally cylindrical first body having a wrench-receiving multi-faceted portion located between axially opposite first and second ends of said first body, a first externally threaded portion adjacent said first end of said first body and a cylindrical coaxial bore opening at said second end of said first body, said bore of said first body having a first internal groove therein, a generally cylindrical second body having axially opposite first and second ends and a second externally threaded portion at said second axial end of said second body, a cylindrical reduced diameter shank portion extending axially of said second body from said second externally threaded portion thereof to said first end of said second body and rotatably coaxially received in said cylindrical coaxial bore of said first body, a male-wrench-receiving multi-faceted socket with a plurality of planar surfaces in said second body threaded portion having an opening at said second axial end of said second body, said shank portion having a second external groove aligned radially and registering axially with said first internal groove in said bore of said first body and a circular retainer member disposed in said first and second grooves for axially retaining said second body on said first body while permitting relative rotation therebetween.

2. The fitting set forth in claim 1 wherein said wrench-receiving multi-faceted portion comprises a multi-faceted male protrusion formed externally on said first body and having a wire insertion passageway extending from an opening of said wire insertion passageway located in an external face of said male protrusion inwardly to a tangential entrance to said first internal groove in said bore of said first body, and said circular retainer member comprises a length of flexible wire inserted leading end first into and through said opening of said insertion passageway and into an annular space defined by and between said grooves with sufficient force to bend said wire into a curvilinear form until said leading end substantially abuts a trailing run of the wire entering said annular space from the insertion passageway, said wire being severed substantially flush with said external face of said male protrusion to thereby form in-situ said retainer member.

3. The fitting set forth in claim 1 wherein said first body has a central fluid conducting passage that opens at said first end of said first body and into said bore of said first body, and wherein said second body has a central axial fluid conducting passage that opens at said first end of said second body and into said socket of said second body to thereby form in conjunction with said bore of said first body and said socket of said second body a continuous fluid conducting through-passageway in said fitting.

4. The fitting set forth in claim 3 wherein said first body has a first external annular sealing surface located thereon between said first externally threaded portion of said first body and an adjacent first radial side of an annular protrusion on said first body, said first body having a cylindrical extension portion at said second end of said first body with a second external annular sealing surface formed thereon adjacent a second radial side of said protrusion axially opposite from said first radial side of said annular protrusion and first and second O-rings respectively individually carried on said first and second annular sealing surfaces.

5. The fitting set forth in claim 3 wherein said wrench-receiving multi-faceted portion comprises a multi-faceted male protrusion formed externally on said first body and having a wire insertion passageway extending from an opening of said wire insertion passageway located in an external face of said male protrusion inwardly to a tangential entrance to said first internal groove in said bore of said first body, and said circular retainer member comprises a length of flexible wire inserted leading end first into and through said opening of said insertion passageway and into an annular space defined by and between said grooves with sufficient force to bend said wire into a curvilinear form until said leading end substantially abuts a trailing run of the wire entering said annular space from the insertion passageway, said wire being severed substantially flush with said external face of said male protrusion to thereby form in-situ said retainer member.

6. The fitting set forth in claim 4 wherein said wrench-receiving multi-faceted portion comprises a multi-faceted male protrusion formed externally on said first body and having a wire insertion passageway extending from an opening of said wire insertion passageway located in an external face of said male protrusion inwardly to a tangential entrance to said first internal groove in said bore of said first body, and said circular retainer member comprises a length of flexible wire inserted leading end first into and through said opening of said insertion passageway and into an annular space defined by and between said grooves with sufficient force to bend said wire into a curvilinear form until said leading end substantially abuts a trailing run of the wire entering said annular space from the insertion passageway, said wire being severed substantially flush with said external face of said male protrusion to thereby form in-situ said retainer member.

7. The fitting set forth in claim 1 in further combination with at least two separable first and second module blocks arranged side-by-side, each of said blocks having a first through-passageway extending between opposite side faces of each said module block, each said module block also having a pair of first end openings located one in each of said opposite side faces at axially opposite ends of said first through-passageway and communicating therewith, each of said first end openings having internal threads adapted to threadably mate with a corresponding one of said first and second externally threaded portions of said fitting, and wherein each one of said pair of first end openings of said first through-passageway in one of said opposite side faces in said first module block is adjacent to another one of said pair of said first end openings in said second modular block thereby defining a mutually facing pair of said first end openings which are coaxially aligned and wherein said blocks are mechanically tied together by said fitting with each of said first and second externally threaded portions of said fitting being threadably engaged with one of said first end openings.

8. The combination set forth in claim 7 wherein said first body has a central fluid conducting passageway that opens at said first end of said first body and into said bore of said first body, and wherein said second body has a central axial fluid conducting passage that opens at said first end of said second body and into said socket of said second body to thereby form in conjunction with said bore of said first body and said socket of said second body a continuous fluid conduit through-passageway in said fitting, and wherein said first through-passageways of said first and second block modules are constructed as high pressure fluid conducting passageways communicating with one another via said continuous fluid conduit through-passageway, and said first body of said fitting carries first and second external seal means adapted to respectively sealably statically engage an entrance sealing surface portion of each of the mutually facing pair of said first end openings of said first through-passageways.

9. The combination set forth in claim 8 wherein said wrench-receiving multi-faceted portion comprises a multi-faceted male protrusion formed externally on said first body, and wherein said first and second seal means comprises a pair of O-rings received on said first body in axially spaced apart relationship thereon flanking said multi-faceted male protrusion of said first body.

10. The combination set forth in claim 9 wherein said mutually facing pair of said first end openings each have an annular recess for recessing an adjacent portion of said male protrusion of said first body when said opposite side faces of said blocks are adjoined, and wherein each said entrance sealing surface portion of each of said first end openings of said first through-passageway comprises an annular tapered sealing surface formed therein between said recess and said internal threads thereof and sealably receiving and statically engaging said O-rings thereagainst.

11. The combination set forth in claim 10 wherein each of said blocks has a high pressure fluid conducting second through-passageway that opens at said opposite side faces of each of said blocks and extending in laterally spaced apart parallel relation to said first through-passageway, each of said blocks having a pair of second end openings located one in each of said opposite side faces at axially opposite ends of said second through-passageway and communicating therewith, and wherein each one of said pair of second end openings of said second through-passageway in one of said opposite side faces in said first module block is adjacent to another one of said pair of said second end openings in said second modular block thereby defining a second mutually facing pair of said second end openings which are coaxially aligned and constructed identically to said first end openings of said first through-passageways of said first and second blocks, and a second fitting wherein said block are mechanically tied together by each of said first and second externally threaded portions of said second fitting being threadably engaged with one of said second mutually facing pair of said second end openings, with said second mutually facing pair of said second end openings communicating with said second through-passageway.

12. The combination set forth in claim 7 wherein each of said blocks has a second through-passageway that opens at said opposite side faces of each of said blocks and extending in laterally spaced apart parallel relation to said first through-passageway, each of said blocks having a pair of second end openings located one in each of said opposite side faces at axially opposite ends of said second through-passageway and communicating therewith, and wherein each one of said pair of second end openings of said second through-passageway in one of said opposite side faces in said first module block is adjacent to another one of said pair of said second end openings in said second modular block thereby defining a second mutually facing pair of said second end openings which are coaxially aligned and constructed identically to said first end openings of said first through-passageway of said first and second blocks, and a second fitting wherein said blocks are mechanically tied together by each of said first and second externally threaded portions of said second fitting being threadably engaged with one of said second mutually facing pair of said second end openings, with said second mutually facing pair of said second end openings communicating with said second through-passageway.

13. The combination set forth in claim 6 wherein said wrench-receiving socket in said second body has a polygonal shape in radial cross-section, and further including in combination therewith a fitting installation tool in the form of an elongated rod having a working end with a polygonal external male surface adapted to non-rotatably telescopically mesh with said socket of said second body for rotating said second body relative to said first body.

14. The combination set forth in claim 10 wherein said first body has a wire insertion passageway extending from an opening of said wire insertion passageway located in an external face of said male protrusion inwardly to a tangential entrance to said first internal groove in said bore of said first body, and said circular retainer member comprises a length of flexible wire inserted leading end first into and through said opening of said insertion passageway and into an annular space defined by and between said grooves with sufficient force to bend said wire into a curvilinear form until said leading end substantially abuts a trailing run of the wire entering said annular space from the insertion passageway, said wire being severed substantially flush with said external face of said male protrusion to thereby form in-situ said retainer member.

15. The combination set forth in claim 10 wherein said male protrusion has a pair of axially flanking radial extending side faces individually abutting a pair of associated mutually facing radial bottom faces of a mutually facing pair of said annular recesses to thereby dimensionally control the compression forces exerted on said O-rings when said opposite side faces of said blocks are adjoined in assembly of said fitting in said blocks.

16. The fitting set forth in claim 1 wherein said circular retainer member comprises a C-type spring snap ring wherein said first body is connected to said second body by loosely carrying said snap ring in said second groove of said second body, yieldably and resiliently compressing said snap ring to fit within said bore of said first body upon insertion of said shank of said second body into said bore of said first body to thereby compress said snap ring until it registers with said first groove in said first body, and snapping said ring out to be axially captured by both of said grooves.

* * * * *